(12) United States Patent
Han

(10) Patent No.: US 8,902,178 B2
(45) Date of Patent: Dec. 2, 2014

(54) TOUCH PANEL AND MOBILE TERMINAL INCLUDING THE SAME

(75) Inventor: Dongyoup Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 595 days.

(21) Appl. No.: 13/029,952

(22) Filed: Feb. 17, 2011

(65) Prior Publication Data

US 2011/0304566 A1 Dec. 15, 2011

(30) Foreign Application Priority Data

Jun. 15, 2010 (KR) ........................ 10-2010-0056443

(51) Int. Cl.
*G06F 3/041* (2006.01)
*G06F 3/044* (2006.01)

(52) U.S. Cl.
CPC ..................................... *G06F 3/044* (2013.01)
USPC .......................... 345/173; 345/174; 178/18.01

(58) Field of Classification Search
CPC ................. G06F 3/044; G06F 3/0416; G06F 2203/04104; G06F 2203/04111; G06F 1/169; G06F 1/1692
USPC ................. 345/173, 174; 178/18.01
See application file for complete search history.

(56) References Cited

U.S. PATENT DOCUMENTS

| | | | | |
|---|---|---|---|---|
| 2008/0264699 A1* | 10/2008 | Chang et al. | ............... | 178/18.01 |
| 2009/0096757 A1* | 4/2009 | Hotelling et al. | ............. | 345/173 |
| 2009/0135151 A1 | 5/2009 | Sun | | |
| 2011/0090154 A1* | 4/2011 | Kuo | ............................. | 345/173 |
| 2012/0098781 A1* | 4/2012 | Kim et al. | ..................... | 345/174 |
| 2012/0127095 A1* | 5/2012 | Jun | ............................... | 345/173 |

FOREIGN PATENT DOCUMENTS

| | | |
|---|---|---|
| CN | 101719038 A | 6/2010 |
| WO | WO 2007/024486 A2 | 3/2007 |

* cited by examiner

*Primary Examiner* — Amare Mengistu
*Assistant Examiner* — Jennifer Zubajlo
(74) *Attorney, Agent, or Firm* — Birch, Stewart, Kolasch & Birch, LLP

(57) ABSTRACT

A touch panel and mobile terminal including the same are disclosed. The present invention reduces a width of an inactive area of the touch panel, implements a large-scale touchscreen despite maintaining the same width of an inactive area, increments the number of touch channels despite maintaining the same width of an inactive area, and detects a touched position in a manner of subdividing the touched position despite maintaining the same width of an inactive area.

10 Claims, 10 Drawing Sheets

TOUCH PANEL AND MOBILE TERMINAL INCLUDING THE SAME

Pursuant to 35 U.S.C. §119(a), this application claims the benefit of the Korean Patent Application No. 10-2010-0056443, filed Jun. 15, 2010, which is hereby incorporated by reference as if fully set forth herein, under 37 CFR 119.

BACKGROUND OF THE INVENTION

1. Field of the Invention

The present invention relates to a touch panel, and more particularly, to a touch panel and mobile terminal including the same. Although the present invention is suitable for a wide scope of applications, it is particularly suitable for determining an input signal be detecting a contact position.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a mobile terminal tends not to have a separate keyboard externally exposed irrespective of a use mode but to have a touchscreen including a touch panel playing a role as a keypad.

Such a touchscreen type does not use a such a separate input device as a keypad. If a finger or the like touches a specific position of a character, an icon or the like on a screen, the touched position is obtained and a corresponding specific function is then executed.

Generally, a capacitance type touch panel includes a plurality of polygonal touch panels formed of conductive substance. In particular, a plurality of the touch panels are electrically connected to one another in a specific direction to configure a pattern part. A plurality of the pattern parts construct a pattern array. The pattern array is arranged in horizontal and vertical directions to configure virtual coordinates.

The touch panel includes an active area for displaying a character, an icon and the like externally to detect a touch and an inactive area arranged along an edge of the active area to be non-transparently processed. A plurality of touch panels are provided to the active area to detect a touched position. And, a plurality of signal lines electrically connected to a plurality of the touch channels respectively are provided to the inactive area.

If the number of the touch panels gets incremented, the touch position can be detected more accurately. Yet, if so, the number of the signal lines connected to the touch panels respectively becomes incremented as well and a proper gap should be maintained between the signal lines adjacently arranged in the inactive area. Hence, a size of the inactive area increases. And, a quality of exterior is degraded.

Meanwhile, in order to reduce a width of the inactive area, the number of touch channels should be decremented. Hence, it is difficult to implement a large-scale display and an accurate touched position.

SUMMARY OF THE INVENTION

Accordingly, the present invention is directed to a touch panel and mobile terminal including the same that substantially obviate one or more problems due to limitations and disadvantages of the related art.

An object of the present invention is to provide a touch panel and mobile terminal including the same, by which a width of an inactive area of the touch panel can be reduced.

Another object of the present invention is to provide a touch panel and mobile terminal including the same, by which a large-scale touchscreen can be implemented despite maintaining the same width of an inactive area.

Another object of the present invention is to provide a touch panel and mobile terminal including the same, by which the number of touch channels can be incremented despite maintaining the same width of an inactive area.

A further object of the present invention is to provide a touch panel and mobile terminal including the same, by which a touched position can be detected in a manner of being subdivided despite maintaining the same width of an inactive area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display, a substrate disposed on the display, the substrate having an active area and an inactive area, a first electrode pattern array disposed on the active area of the substrate, the first electrode pattern having a plurality of touch channels for detecting a touch, a second electrode pattern array disposed on the active area of the substrate, the second electrode pattern having a plurality of touch channels for detecting the touch, a plurality of first signal lines disposed on the inactive area of the substrate, the first signal lines respectively extending from the touch channels of the first electrode pattern array along a first direction of the substrate, a plurality of second signal lines disposed on the inactive area of the substrate, the second signal lines respectively extending from the touch channels of the second electrode pattern array along a second direction different from the first direction of the substrate, and a control unit electrically connected to each of the signal lines.

In another aspect of the present invention, a mobile terminal includes a display having a display area and a non-display area, a touch sensor provided to the display area of the display, the touch sensor including a first active area having a plurality of touch channels for detecting a touch and a second active area having a plurality of touch channels for detecting the touch, a plurality of first signal lines electrically connected to the touch channels of the first active area respectively in a manner of extending on the non-display area along a first direction, a plurality of second signal lines electrically connected to the touch channels of the second active area respectively in a manner of extending on the non-display area along a second direction different from the first direction, and a control unit electrically connected to each of the signal lines.

In a further aspect of the present invention, a touch panel includes a substrate having an active area and an inactive area, a first electrode pattern array disposed on the active area of the substrate, the first electrode pattern having a plurality of touch channels for detecting a touch, a second electrode pattern array disposed on the active area of the substrate, the second electrode pattern having a plurality of touch channels for detecting the touch, a plurality of first signal lines disposed on the inactive area of the substrate, the first signal lines respectively extending from the touch channels of the first electrode pattern array along a first direction of the substrate, a plurality of second signal lines disposed on the inactive area of the substrate, the second signal lines respectively extending from the touch channels of the second electrode pattern array along a second direction different from the first direction of the substrate, a first drive circuit unit connected to the first signal lines to transfer an electric signal as a coordinate signal, and a second drive circuit unit connected to the second lines to transfer the electric signal as the coordinate signal.

Accordingly, the present invention provides the following effects and/or advantages.

First of all, the present invention can reduce a width of an inactive area of the touch panel.

Secondly, the present invention can implement a large-scale touchscreen despite maintaining the same width of an inactive area.

Thirdly, the present invention can increment the number of touch channels despite maintaining the same width of an inactive area.

Finally, the present invention can detect a touched position in a manner of subdividing the touched position despite maintaining the same width of an inactive area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
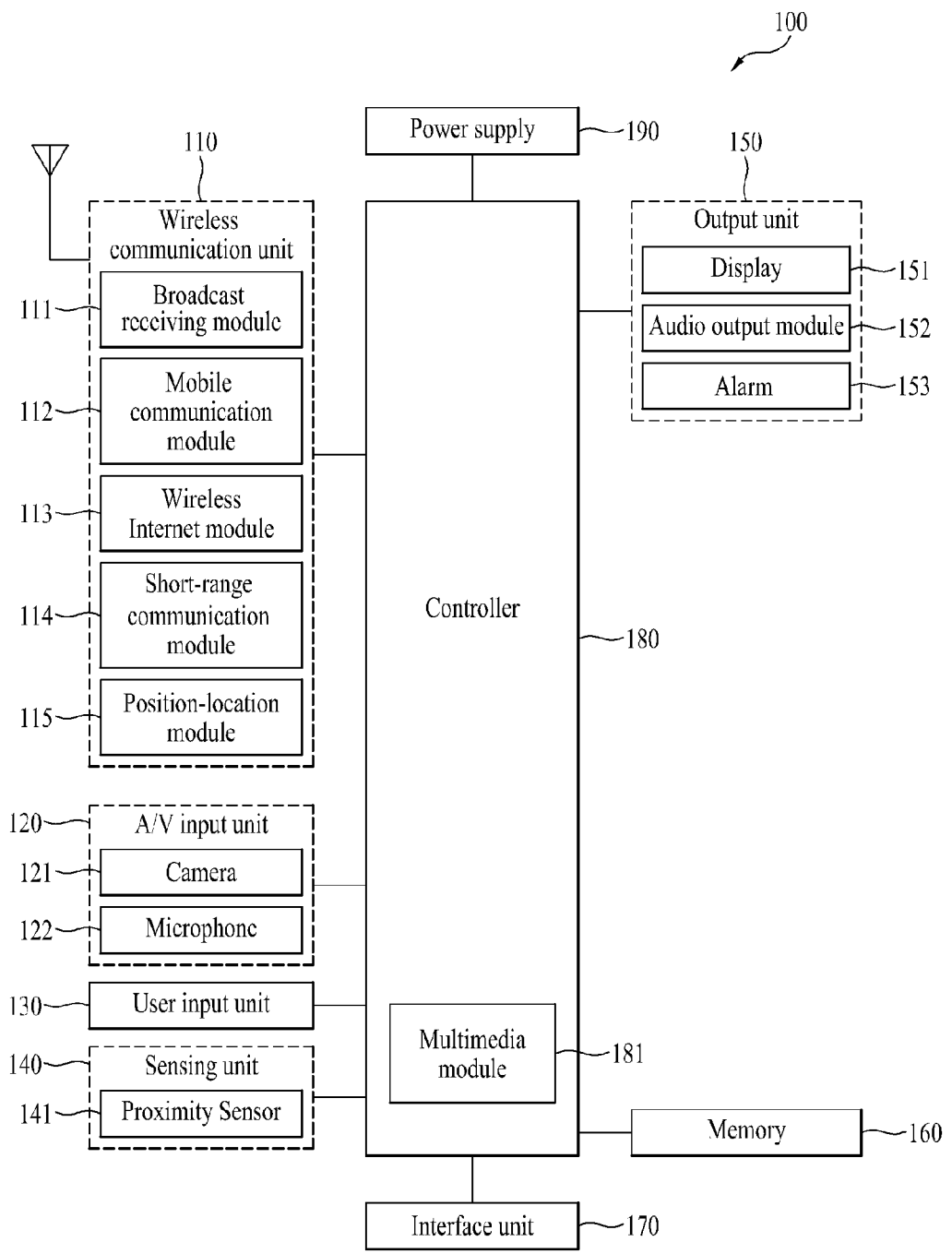
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous receptions of at least two broadcast channels or broadcast channel switching facilitation.

Examples of broadcast associated information include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN)(Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays can be configured transparent so that an external environment can be seen through the corresponding display. Such a display can be called a transparent display. As a representative example for the transparent display, there is a transparent LCD display or the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor 141 can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

Example for an operational principle of the proximity sensor is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch is able to detect the object to detect without interference with the material.

In spite of not providing the proximity sensor, if the touchscreen is electrostatic, it can be configured to detect the proximity of a pointer through an electric field change attributed to the proximity of the pointer.

So, in case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor is used, it is able to sense a proximity touch and its pattern (e.g., proximity touch distance, proximity touch direction, proximity touch speed, proximity touch position, proximity touch moving state, etc.). And, it is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touchscreen can be stored in the memory 160.

As map information can be stored in the memory 160, user's convenience can be further provided in a manner of providing the map information to a user if necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
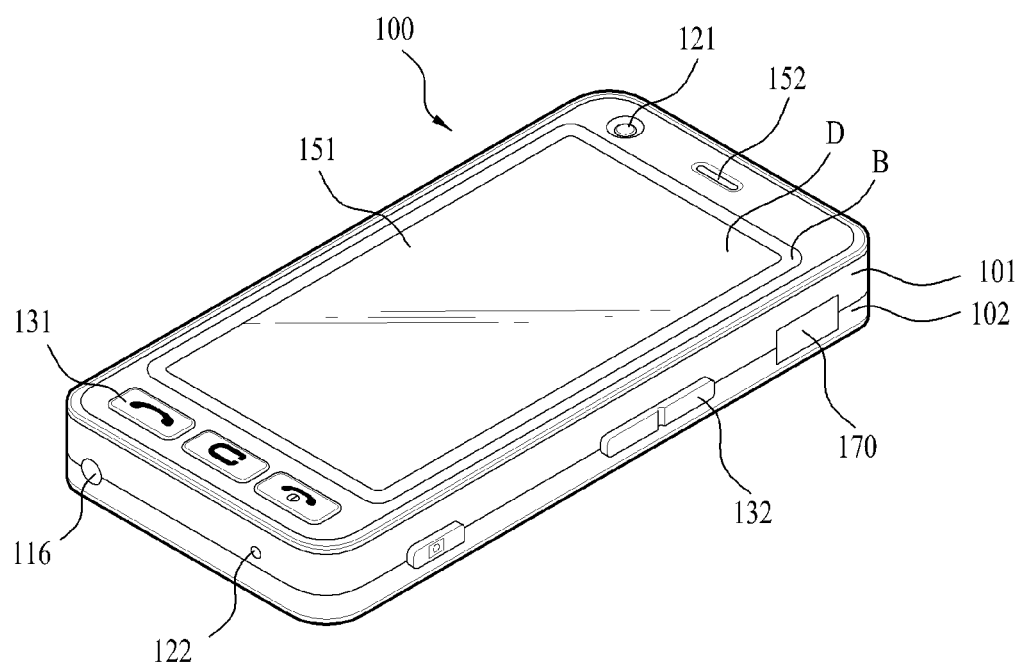
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body.

Yet, the mobile terminal 100 may be implemented in a variety of different configurations. Examples of such configurations include a folder type, a slide type, a rotational type, a swing type and combinations thereof. For clarity, further disclosure will primarily relate to a bar-type mobile terminal 100. However such teachings apply equally to other types of mobile terminals.

Referring to FIG. 2, a body of the mobile terminal 100 includes a case (e.g., a casing, a housing, a cover, etc.) configuring an exterior thereof. According to the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, a user input unit 130 (131/132), a microphone, an interface 170 and the like can be provided to the terminal body, and mainly, to the front case 101.

The display 151 occupies most of a main face of the front case 101. The audio output unit 151 and the camera 121 are provided to an area adjacent to one of both end portions of the display 151, while the first user input unit 131 and the microphone 122 are provided to another area adjacent to the other end portion of the display 151. The second user input unit 132, the interface 170 and the like can be provided to lateral sides of the front and rear cases 101 and 102.

The user input unit 130 is manipulated to receive an input of a command for controlling an operation of the terminal 100. And, the input unit 130 is able to include a plurality of manipulating units 131 and 132. The manipulating units 131 and 132 can be generally named a manipulating portion and may adopt any mechanism of a tactile manner that enables a user to perform a manipulating action by experiencing a tactile feeling.

Content inputted by the manipulating units 131 and 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
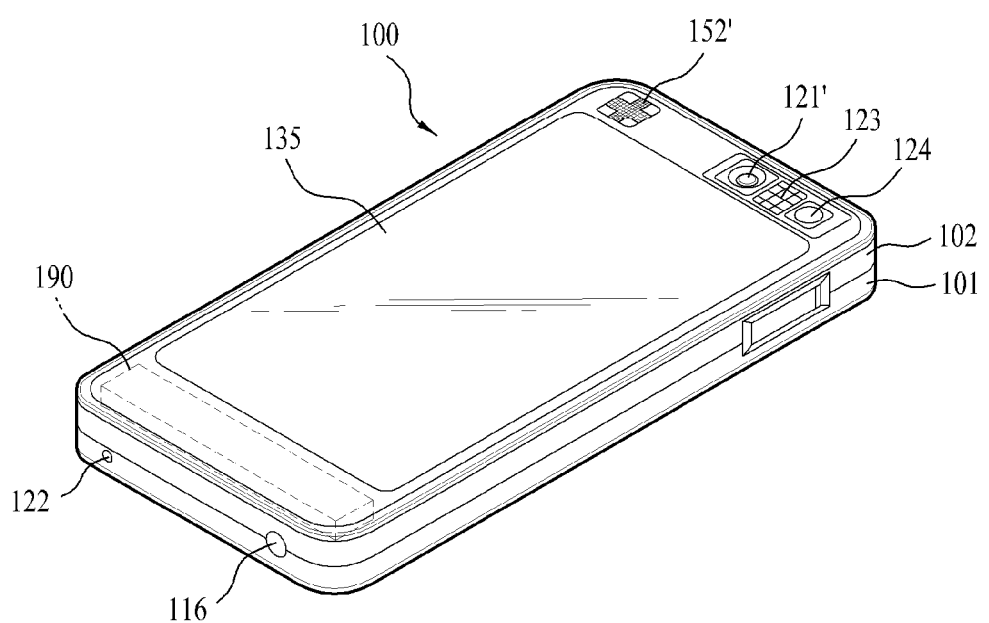
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the former camera 121.

Preferably, for instance, the former camera 121 has low pixels enough to take and transmit a picture of user's face for a video call, while the latter camera 121' has high pixels for capturing a general subject for photography without transmitting the captured subject.

And, each of the cameras 121 and 121' can be installed at the terminal body to be rotatable or popped up.

A flash 123 and a mirror 124 are additionally provided adjacent to the camera 121'. The flash 123 projects light toward a subject in case of photographing the subject using the camera 121'. In case that a user attempts to take a picture of the user (self-photographing) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the mobile terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmitting type like the display 151. In this case, if the display 151 is configured to output visual information from its both faces, it is able to recognize the visual information via the touchpad 135 as well. The information outputted from both of the faces can be entirely controlled by the touchpad 135. Alternatively, another display is further provided to the touchpad 135 so that a touchscreen can be provided to the rear case 102 as well.

The touchpad 135 is activated by interconnecting with the display 151 of the front case 101. The touchpad 135 can be provided in front or rear of the display 151 in parallel. The touchpad 135 can have a size equal to or smaller than that of the display 151.

Interconnected operational mechanism between the display 151 and the touchpad 135 is explained with reference to FIG. 4 and FIG. 5 as follows.

Figure 4:
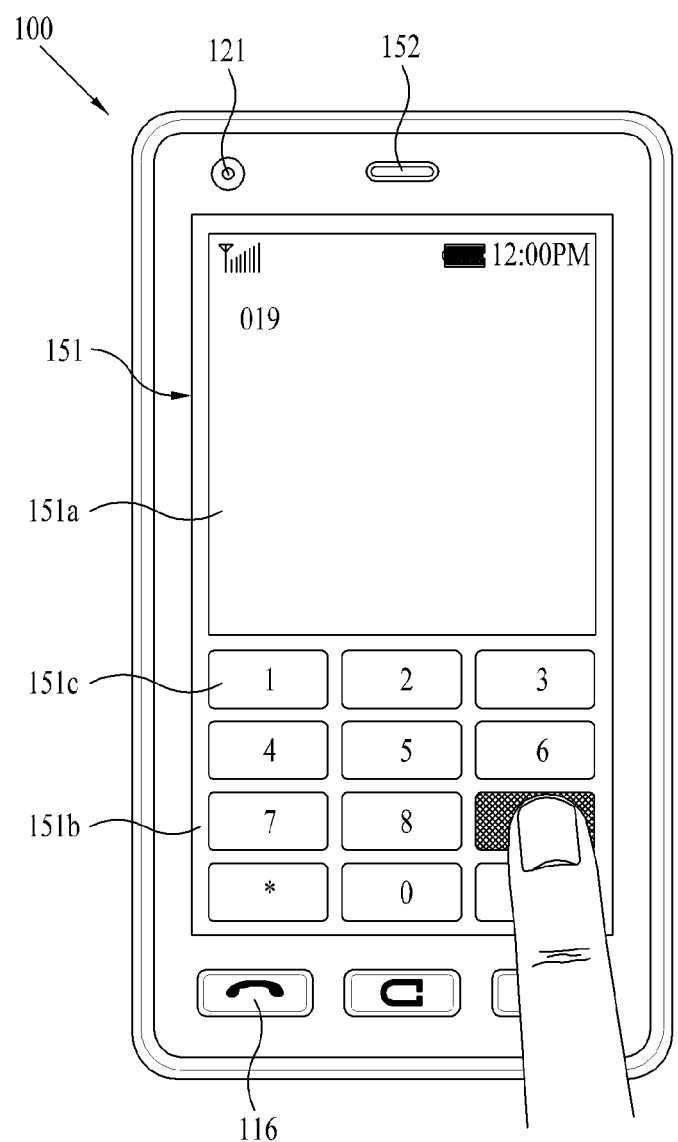
FIG. 4 and FIG. 5 are front diagrams of a mobile terminal according to one embodiment of the present invention for explaining one operational status of the mobile terminal, respectively.
Figure 5:
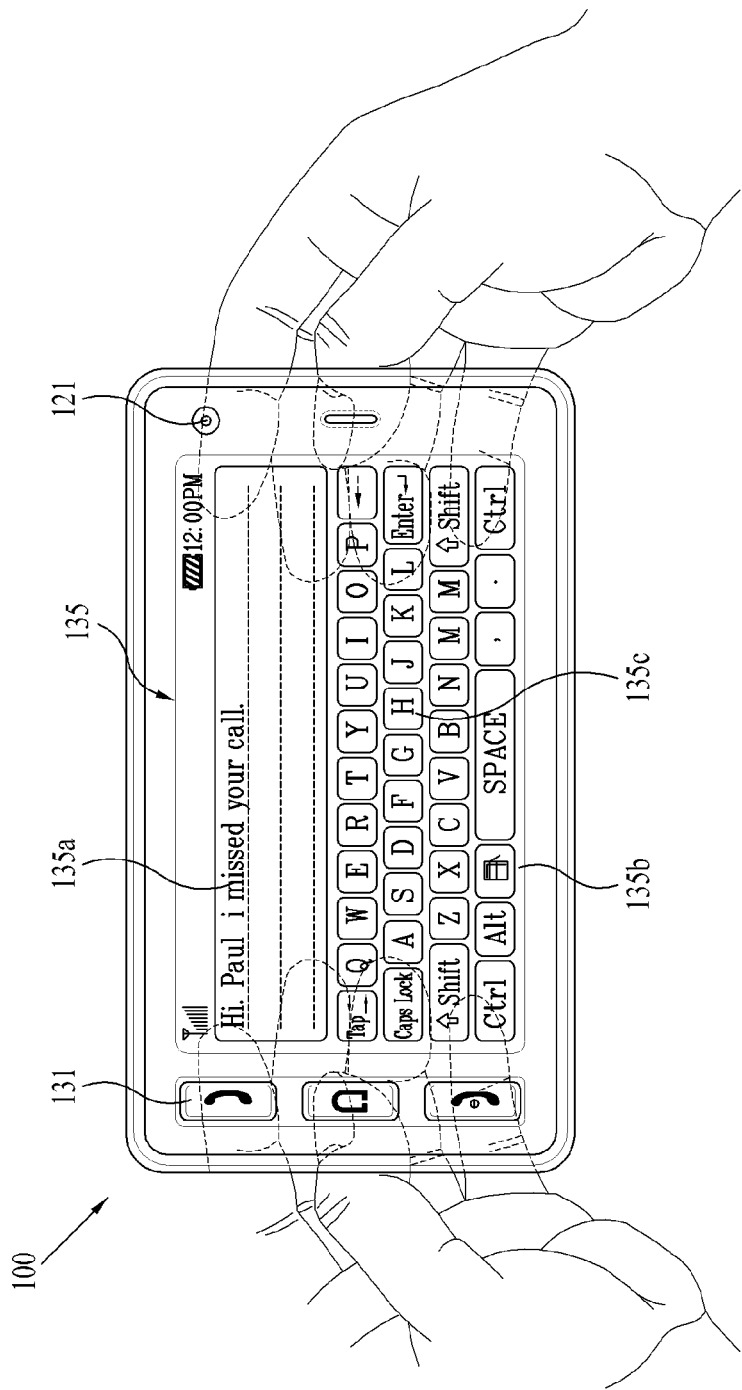

FIG. 4 and FIG. 5 are front-view diagrams of a mobile terminal according to one embodiment of the present invention for explaining an operational state thereof.

First of all, various kinds of visual informations can be displayed on the display 151. And, theses informations can be displayed in characters, numerals, symbols, graphics, icons and the like.

In order to input the information, at least one of the characters, numerals, symbols, graphics and icons is represented as a single predetermined array to be implemented in a keypad formation. And, this keypad formation can be so-called 'soft keys'.

FIG. 4 shows that a touch applied to a soft key is inputted through a front face of a terminal body.

Referring to FIG. 4, the display 151 is operable through an entire area or by being divided into a plurality of regions. In the latter case, a plurality of the regions can be configured interoperable.

For instance, an output window 151a and an input window 151b are displayed on the display 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection to the phone number displayed on the output window 151a is tried.

FIG. 5 shows that a touch applied to a soft key is inputted through a rear face of a terminal body. FIG. 4 shows a case that the terminal body is vertically arranged (i.e., portrait), whereas FIG. 5 shows a case that the terminal body is horizontally arranged (i.e., landscape). And, the display 151 can be configured to change an output picture according to the arranged direction of the terminal body.

FIG. 5 shows that a text input mode is activated in the mobile terminal.

Referring to FIG. 5, an output window 135a and an input window 135b are displayed on the display 151. A plurality of soft keys 135c representing at least one of characters, symbols and digits can be arranged in the input window 135b. The soft keys 135c can be arranged in the QWERTY key formation.

If the soft keys 135c are touched through the touchpad 135, the characters, symbols and digits corresponding to the touched soft keys are outputted to the output window 135a. Thus, the touch input via the touchpad 135 is more advantageous in that the soft keys 135c can be prevented from being blocked by a finger than the touch input via the display 151. In case that both of the display 151 and the touchpad 135 are configured transparent, it is able to visually check fingers located at the backside of the terminal body. Hence, more correct touch inputs are possible.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touchscreen) 151 and the touchpad 135 are touched together within a range of predetermined duration, one function of the terminal can be executed. The above case of the simultaneous touch may correspond to a case that the terminal body is held by a user using a thumb and a first finger (clamping). The above function can include activation or deactivation of the display 151 or the touchpad 135.

A mobile terminal according to one embodiment of the present invention includes a display, a substrate disposed on the display, the substrate having an active area and an inactive area, a first electrode pattern array disposed on the active area of the substrate, the first electrode pattern having a plurality of touch channels for detecting a touch, and a second electrode pattern array disposed on the active area of the substrate, the second electrode pattern having a plurality of touch channels for detecting the touch.

The mobile terminal further includes a plurality of first signal lines disposed on the inactive area of the substrate, the first signal lines respectively extending from the touch channels of the first electrode pattern array along a first direction of the substrate, a plurality of second signal lines disposed on the inactive area of the substrate, the second signal lines respectively extending from the touch channels of the second electrode pattern array along a second direction different from the first direction of the substrate, and a control unit electrically connected to each of the signal lines.

A mobile terminal according to another embodiment of the present invention includes a display having a display area and a non-display area, a touch sensor provided to the display area of the display, the touch sensor including a first active area having a plurality of touch channels for detecting a touch and a second active area having a plurality of touch channels for detecting the touch, a plurality of first signal lines electrically connected to the touch channels of the first active area respectively in a manner of extending on the non-display area along a first direction, a plurality of second signal lines electrically connected to the touch channels of the second active area respectively in a manner of extending on the non-display area along a second direction different from the first direction, and a control unit electrically connected to each of the signal lines.

A touch panel according to one embodiment of the present invention includes a substrate having an active area and an inactive area, a first electrode pattern array disposed on the active area of the substrate, the first electrode pattern having a plurality of touch channels for detecting a touch, a second electrode pattern array disposed on the active area of the substrate, the second electrode pattern having a plurality of touch channels for detecting the touch, a plurality of first signal lines disposed on the inactive area of the substrate, the first signal lines respectively extending from the touch channels of the first electrode pattern array along a first direction of the substrate, a plurality of second signal lines disposed on the inactive area of the substrate, the second signal lines respectively extending from the touch channels of the second electrode pattern array along a second direction different from the first direction of the substrate, a first drive circuit unit connected to the first signal lines to transfer an electric signal as a coordinate signal, and a second drive circuit unit connected to the second lines to transfer the electric signal as the coordinate signal.

In the following description, a touch panel and mobile terminal including the same according to one embodiment of the present invention are explained in detail with reference to the accompanying drawings.

Figure 6:
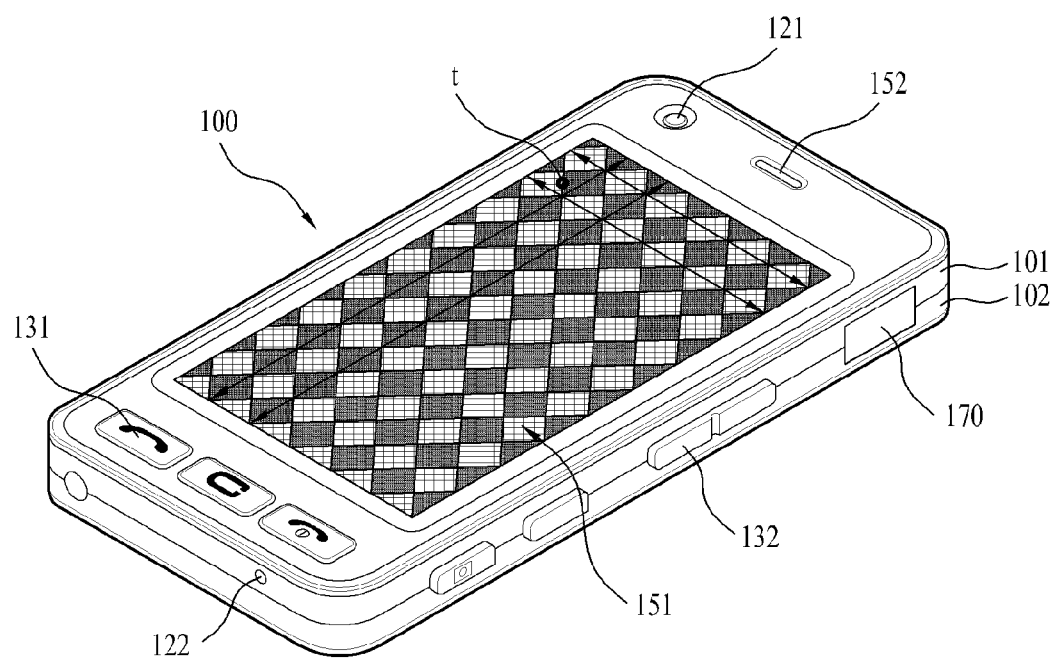
FIG. 6 is a perspective diagram of a mobile terminal according to the present invention, in which an electrode pattern array is schematically shown.
Figure 7:
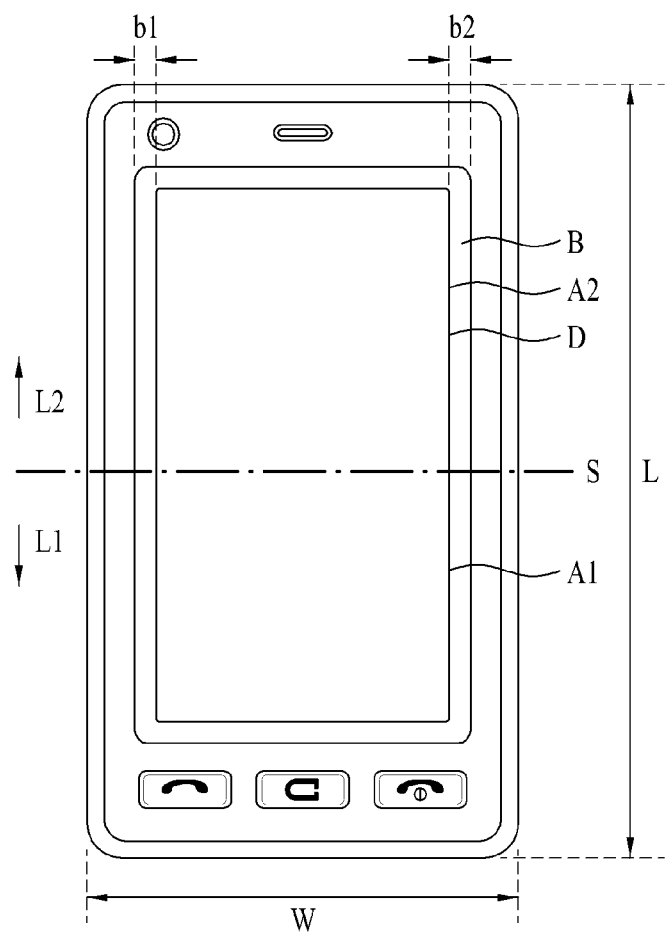
FIG. 7 is a front diagram of a mobile terminal according to one embodiment of the present invention.

FIG. 6 is a perspective diagram of a mobile terminal according to the present invention, in which an electrode pattern array is schematically shown. FIG. 7 is a front diagram of a mobile terminal according to one embodiment of the present invention. And, FIG. 8 is a cross-sectional diagram of a touch panel according to one embodiment of the present invention.

Figure 8:
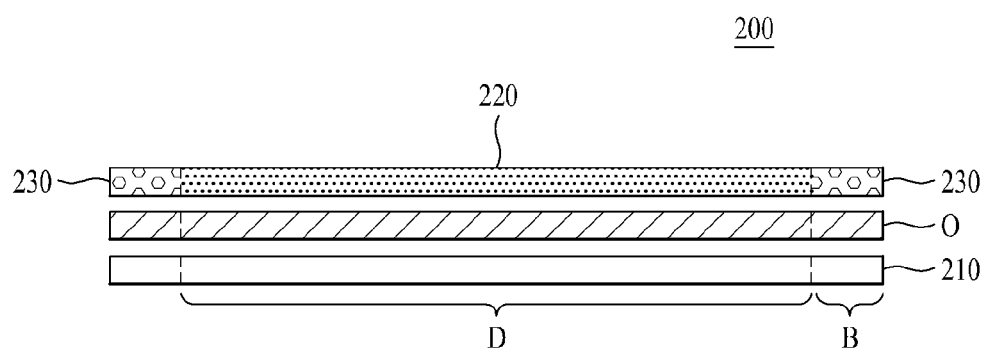
FIG. 8 is a cross-sectional diagram of a touch panel according to one embodiment of the present invention.

Referring to FIGS. 6 to 8, a plurality of touch channels C can be formed in an electrode pattern array 220. In particular, each of the touch channels C can be formed in a manner that a lozenge-shaped conductor on a touchscreen of the mobile terminal 100 and an adjacent lozenge-shaped conductor are connected with each other by having their vertexes contact with each other. Each of the touch channels C can be formed in a circular or elliptical shape as well as such a polygon as a triangle, a quadrangle, a hexagon and the like.

Moreover, a lozenge-shaped conductor configuring a touch channel in a vertical direction can be provided to another lozenge-shaped space provided among four sides of a lozenge configuring the touch channels in a horizontal direction.

This formation can prevent interference from being generated from conductors configuring a horizontal touch channel and a vertical touch channel. If a touch is inputted to a specific point t of the touchscreen having this formation, an increasing quantity of capacitance of the horizontal and vertical touch channels closest to the touched point t is raised. A drive circuit unit determines coordinates of the touched point by detecting a variation of this capacitance value and is then able to transfer a corresponding touch signal to the controller 180 of the mobile terminal 100.

In the following description, a touch panel 200 provided to configure the display unit 151 of the touchscreen type is explained.

First of all, the touchscreen type display unit 151 can include a display having a display area and a non-display area located along an edge of the display area and a touch sensor provided to the display area of the display to detect a user touch.

As mentioned in the foregoing description, the display can include at least one of a liquid crystal display (LCD), a thin film transistor-liquid crystal display (TFT LCD), an organic light-emitting diode (OLED) display, a flexible display, a 3D display and the like.

In this case, the touch sensor conceptionally includes the substrate 210 and a transparent electrode pattern layer 220. And, the touch sensor includes a first active area corresponding to a first electrode pattern array and a second active area corresponding to a second electrode pattern array.

Figure 9:
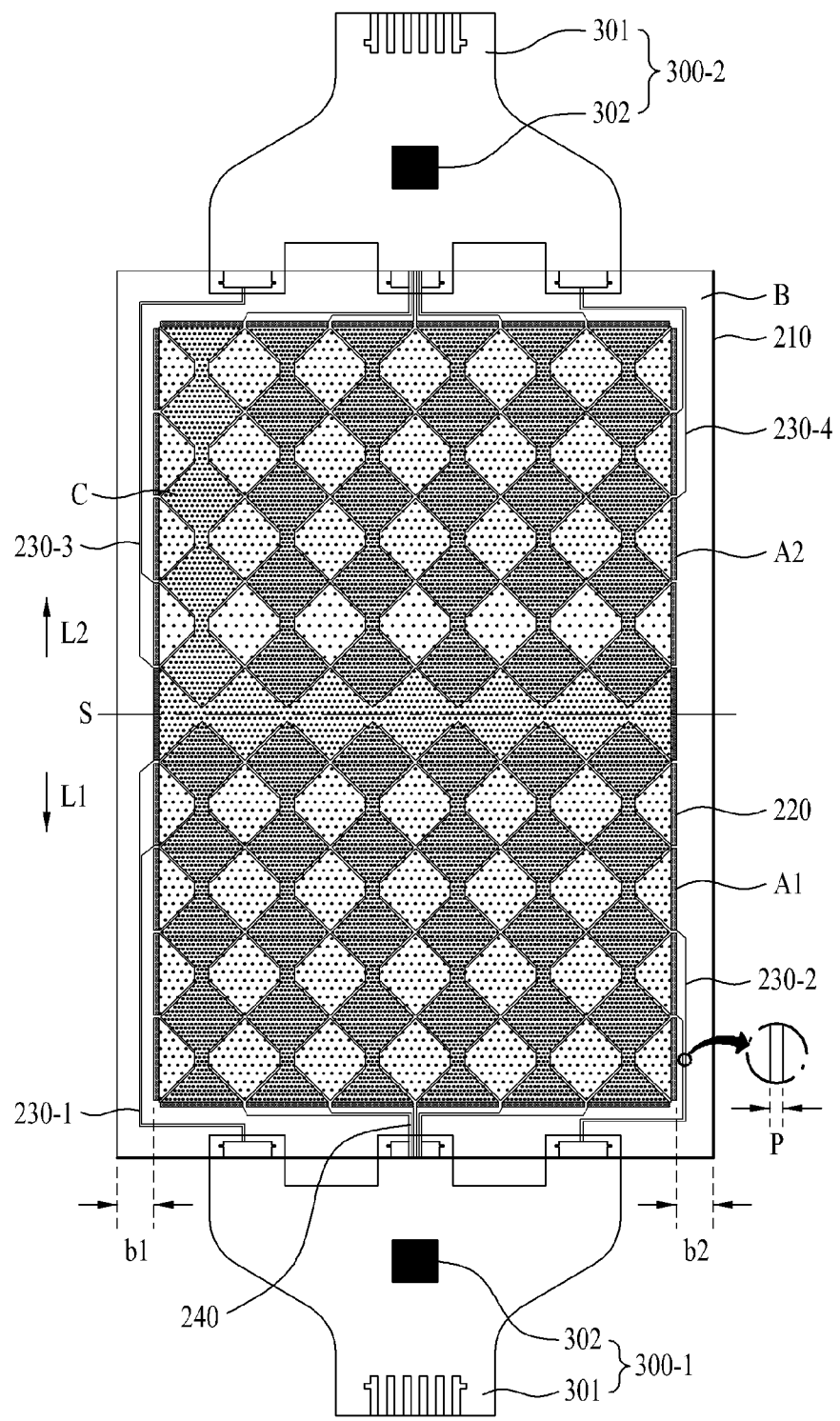
FIG. 9 is a front diagram of a touch panel according to one embodiment of the present invention.
Figure 10:
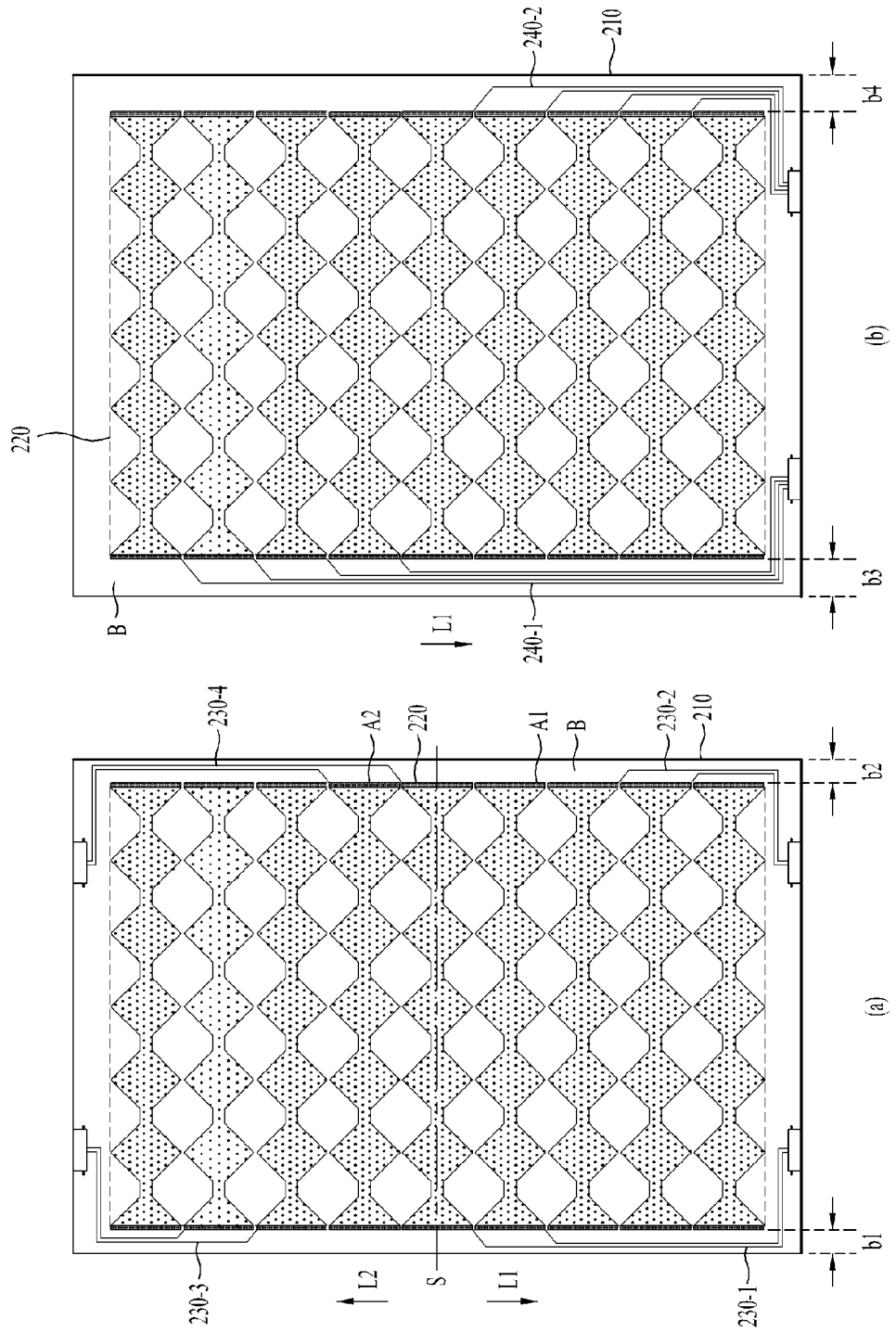
FIG. 10 is a front diagram of a touch panel according to one embodiment of the present invention for explaining effects of the touch panel.

FIG. 9 is a front diagram of a touch panel according to one embodiment of the present invention, and FIG. 10 is a front diagram of a touch panel according to one embodiment of the present invention for explaining effects of the touch panel.

A touch panel 200 according to one embodiment of the present invention includes a substrate 210 having an active area D and an inactive area B, a first electrode pattern array A1 provided to the active area D of the substrate, the first electrode pattern array A1 having a plurality of touch channels to detect a touch, and a second electrode pattern array A2 provided to the active area D of the substrate, the second electrode pattern array A2 having a plurality of touch channels to detect the touch.

The substrate 210 is formed of a dielectric film having high light-transmissivity and can be formed of a transparent substance. For instance, the substrate 210 can be formed of at least one of Glass, PET (Polyethylene Terephthalate), PEN (Polyethylene Naphthalate), Polyimide, PC (Polycarbonate) and Acryl, by which the present invention is non-limited.

The substrate 210 includes the active area D and the inactive area B located along the edge of the active area D.

In this disclosure, the active area D corresponds to the display area externally exposed to detect a touch input in the display unit 151 of the touchscreen type. And, inactive area B corresponds to the non-display area (or a bezel area) provided to the display unit 151 of the touchscreen type not to externally expose inner components (e.g., various lines, etc.).

The substrate 210 includes a single substrate or can include at least two single substrates stacked on one another.

A transparent electrode pattern layer 220 including a plurality of touch channels C to detect a touch is formed on the active area D. In particular, the transparent electrode pattern layer 220 includes a first electrode pattern array A1 and a second electrode pattern array A2, which are partitioned in one of length and width directions of the substrate 210.

The substrate 210 and the transparent electrode pattern layer 220 can be attached together by an interlayer adhesive agent O. In this case, the interlayer adhesive agent can include such a transparent adhesive as an optically clear adhesive (OCA) and the like.

A shield electrode pattern for cutting off a noise signal can be formed on a surface opposing one surface of the substrate 210 having the transparent electrode pattern layer 220 provided thereto to eliminate EMI (electromagnetic interference) noise.

A shield electrode line electrically connected to the shield electrode pattern can be provided to the inactive area B of the substrate 210. In this case, the shield electrode pattern can have one of a plate type, a mesh type and the like.

Each of the electrode pattern arrays 220 (A1 and A2) can be formed of at least one of ITO, IZO, AZO (Al-doped ZnO), carbon nanotube (CNT), PEDOT (poly(3,4-ethylenedioxythiophene)), Ag or Cu transparent ink and the like.

As mentioned in the foregoing description, the transparent electrode pattern layer 220 includes an electrode pattern array having a plurality of horizontal and vertical touch channels C and can be partitioned into two regions along either a length direction L or a width direction W. In this case, one of the two regions is named a first electrode pattern array A1 and the other is named a second electrode pattern array A2.

Moreover, the first and second electrode pattern arrays A1 and A2 can be electrically separated from or connected to each other.

In FIGS. 7 to 10, the transparent electrode pattern layer 220 is partitioned into the two regions along the length direction L of the substrate. In particular, with reference to a partitioning line S, a lower region is named a first electrode pattern array A1 and an upper area is named a second electrode pattern array A2, by which the present invention is non-limited. Alternatively, the transparent electrode pattern layer 220 can be partitioned into two regions along the width direction W of the substrate 210.

Each of the first and second electrode pattern arrays A1 and A2 can have the same size and/or the same number of the touch channels C. A sum of the sizes of the first and second electrode pattern arrays A1 and A2 can be equal to a size of the active area D of the substrate 210.

Referring to FIG. 8, the touch panel 200 according to one embodiment of the present invention includes first and second signal lines 230 provided to the inactive area B of the substrate 210 to transfer touch coordinates inputted to the electrode pattern layer 220 to the controller 180 of the mobile terminal 100.

Referring to FIG. 9, each of the signal lines 230 electrically connects the controller 180 to the touch channels C of the first and second electrode pattern arrays A1 and A2 generated from partitioning the transparent electrode pattern layer 220 into the two regions along the length direction L of the substrate 210. And, the signal lines 230 are provided to the inactive area B of the substrate 210.

The signals lines can be divided into the first signal lines 230-1 and 230-2 extending in a first direction (e.g., a bottom direction L1) with reference to the partitioning line S in the length direction of the substrate and the second signal lines 230-3 and 230-4 extending a second direction (e.g., top direction L2) different from the first direction.

The first signal lines 230-1 and 230-2 extend along the first direction of the substrate from the touch channels C of the first electrode pattern array A1, respectively. And, a plurality of the first signal lines are provided to correspond to the number of the touch channels.

The second signal lines 230-3 and 230-4 extend along the second direction of the substrate from the touch channels C of the second electrode pattern array A2, respectively. And, a plurality of the second signal lines are provided to correspond to the number of the touch channels.

In particular, the first and second signal lines play the same role in electrically connecting the touch channels C of the first and second electrode pattern arrays A1 and A2 to the controller 180 but differ from each other in the extending directions (e.g., the first direction L1 and the second direction L2) on the inactive area B of the substrate B.

In this case, the first direction L1 and the second direction L2 can be set to oppose each other. And, one of the first direction L1 and the second direction L2 can include the length direction L or the width direction W of the substrate 210.

Referring to FIG. 7 and FIG. 9, a plurality of the signal lines 230-1 to 230-4 are provided to correspond to the number of the touch channels and are provided to the inactive area B of the substrate 210.

Each of the signal lines 230-1 to 230-4 extends along the length direction of the substrate 210. And, a predetermined gap between two adjacent signal lines should be maintained to avoid electrical interference in-between.

Referring to FIG. 7, in case that the active area D is partitioned into the first and second electrode pattern arrays A1 and A2 along the length direction L of the substrate 210, the inactive areas B provided to both sides of the active area D has prescribed widths b1 and b2, respectively.

In this case, each of the widths b1 and b2 can depend on the number of the signal lines provided to the inactive area B and the gap p between the signal lines adjacent to each other.

The touch panel 200 includes a first drive circuit unit 300-1 connecting the first signal lines 230-1 and 230-2 to the controller 180 electrically to convert an electric signal inputted via a user touch or the like to a coordinate signal and a second drive circuit unit 300-2 connecting the second signal lines 230-3 and 230-4 to the controller 180 electrically to convert the electric signal inputted via a user touch or the like to the coordinate signal.

Each of the drive circuit units 300-1 and 300-2 can include a flexible printed circuit board (FPCB) 301 and a drive device 302 loaded on the flexible printed circuit board 301 and is electrically connected to the controller 180 of the mobile terminal 100.

As mentioned in the foregoing description, each of the first and second electrode pattern arrays A1 and A2 can have the same size and/or the number of the touch channels C. In this case, the number of the first signal lines 230-1 and 230-2 connected to the corresponding touch channels of the first electrode pattern array A1 is equal to that of the second signal lines 230-3 and 230-4 connected to the corresponding touch channels of the second electrode pattern array A2.

As mentioned in the foregoing description, in order to reduce the widths b1 and b2 of the inactive area of the touch panel 200, the number of the signal lines provided to the inactive area B is decremented or the gap p between the adjacent signal lines should be reduced.

Yet, if the number of the signal lines is decremented, the number of the touch channels is decremented as well. Hence, it may cause a problem that the number of the touch regions for recognizing the touch position is decremented. And, there is a technical difficulty in reducing the gap p between the adjacent signal lines.

For clarity and convenience, referring to FIG. 9 and FIG. 10 (a), the first signal lines 230-1 and 230-2 extend from the first electrode pattern array A1 in a bottom direction with reference to the partitioning line S for partitioning the first and second electrode pattern arrays A1 and A2 along the length direction of the substrate 210. And, the second signal lines 230-3 and 230-4 extend from the second electrode pattern layer A2 in a top direction with reference to the partitioning line S.

The first and second signal lines include four signal lines. In particular, two of the four signal lines are provided to the left inactive area b1, while the other two are provided to the right inactive area b2.

Therefore, the width b1/b2 of the inactive area B depends on the gap p between the two signal lines.

Meanwhile, FIG. 10 (b) shows a case that both of the signal lines 240-1 and 240-2 extend in the same direction L1 along the length direction of the substrate.

Referring to FIG. 10 (b), since all of four signal lines extend in the same direction, the width b3/b4 of the inactive area B becomes at least twice lager than the width b1/b2 of the inactive area shown in FIG. 10 (a) according to the number of the adjacent signal lines and the gap between the two adjacent signal lines.

Hence, the width of the inactive area B of the touch panel 200 can be reduced in the following manner First of all, the transparent electrode pattern layer 220 is divided into two electrode pattern arrays or active areas in one of the length and width direction of the substrate. Secondly, directions of signal lines extending from the electrode pattern arrays or the active areas are arranged to differ from each other.

In case that the widths of the inactive areas of the touch panel 200 are set equal to each other, it is able to increment the number of the touch channels. And, it is able to implement the display unit 151 having a large-scale touch panel.

Moreover, the mobile terminal 100 including the above-configured touch panel 200 is able to reduce the width of the non-display area (bezel area) of the display unit 151, thereby providing an exterior of beauty.

Accordingly, the present invention can reduce a width of an inactive area of the touch panel. The present invention can implement a large-scale touchscreen despite maintaining the same width of an inactive area. The present invention can increment the number of touch channels despite maintaining the same width of an inactive area. And, the present invention can detect a touched position in a manner of subdividing the touched position despite maintaining the same width of an inactive area.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display;
   a substrate disposed on the display, the substrate having an active area and an inactive area located along the four edges of the active area, the inactive area comprising a left inactive portion, a right inactive portion, a top inactive portion and a bottom inactive portion;
   a first electrode pattern array disposed on the active area of the substrate, the first electrode pattern array having a plurality of horizontal touch channels and vertical touch channels for detecting a touch;
   a second electrode pattern array disposed on the active area of the substrate, the second electrode pattern array having a plurality of horizontal touch channels and vertical touch channels for detecting the touch;
   a first drive circuit unit disposed on the bottom inactive portion;
   a second drive circuit unit disposed on the top inactive portion;
   a plurality of first signal lines disposed on the left inactive portion, the right inactive portion and the bottom inactive portion, the first signal lines respectively extending from an end of each horizontal touch channel of the first electrode pattern array to the first drive circuit unit along a first direction of the substrate; and
   a plurality of second signal lines disposed on the left inactive portion, the right inactive portion and the top inactive portion, the second signal lines respectively extending from an end of each horizontal touch channel of the second electrode pattern array to the second drive circuit unit along a second direction opposite from the first direction of the substrate,
   wherein the touch channels are formed in a manner that a plurality of conductors contact each other.

2. The mobile terminal of claim 1, wherein the number of the first signal lines is equal to that of the second signal lines.

3. The mobile terminal of claim 1, wherein a size of the first electrode pattern array is equal to that of the second electrode pattern array.

4. The mobile terminal of claim 1, wherein a sum of the sizes of the first and second electrode pattern arrays is equal to a size of the active area of the substrate.

5. A mobile terminal comprising:
   a display having a display area and a non-display area located along four edges of the display area, the non-display area comprising a left non-display portion, a right non-display portion, a top non-display portion and a bottom non-display portion;
   a touch sensor provided to the display area of the display, the touch sensor including a first active area having a plurality of horizontal touch channels and vertical touch channels for detecting a touch and a second active area having a plurality of horizontal touch channels and vertical touch channels for detecting the touch;
   a plurality of first signal lines electrically connected to an end of each horizontal touch channel of the first active area respectively in a manner of extending on the non-display area along a first direction;
   a plurality of second signal lines electrically connected to an end of each horizontal touch channel of the second active area respectively in a manner of extending on the non-display area along a second direction opposite from the first direction;
   a first drive circuit unit disposed on the bottom non-display portion and connected to each of the first signal lines; and
   a second drive circuit unit disposed on the top non-display portion and connected to each of the second signal lines,
   wherein the touch channels are formed in a manner that a plurality of conductors contact each other.

6. The mobile terminal of claim 5, wherein a size of the first active area is equal to that of the second active area.

7. The mobile terminal of claim 5, wherein a sum of the sizes of the first and second active areas is equal to a size of an active area of the substrate.

8. A touch panel comprising:
   a substrate having an active area and an inactive area located along four edges of the active area, the inactive area comprising a left inactive portion, a right inactive portion, a top inactive portion and a bottom inactive portion;
   a first electrode pattern array disposed on the active area of the substrate, the first electrode pattern array having a plurality of horizontal touch channels and vertical touch channels for detecting a touch;
   a second electrode pattern array disposed on the active area of the substrate, the second electrode pattern array having a plurality of horizontal touch channels and vertical touch channels for detecting the touch;
   a plurality of first signal lines disposed on the left inactive portion, the right inactive portion and the bottom inactive portion, the first signal lines respectively extending from an end of each horizontal touch channel of the first electrode pattern array along a first direction of the substrate;
   a plurality of second signal lines disposed on the left inactive portion, the right inactive portion and the top inactive portion, the second signal lines respectively extending from an end of each horizontal touch channel of the second electrode pattern array along a second direction opposite from the first direction of the substrate;
   a first drive circuit unit connected to the first signal lines to transfer an electric signal as a coordinate signal; and
   a second drive circuit unit connected to the second lines to transfer the electric signal as the coordinate signal,
   wherein the touch channels are formed in a manner that a plurality of conductors contact each other.

9. The touch panel of claim 8, wherein a size of the first electrode pattern array is equal to that of the second electrode pattern array.

10. The touch panel of claim 8, wherein the number of the first signal lines is equal to that of the second signal lines.